United States Patent [19]

White

[11] 4,046,132
[45] Sept. 6, 1977

[54] SELF EXTINGUISHING, PORTABLE COOKING UNIT HAVING FOLDING FUEL TRAYS

[75] Inventor: Charles R. White, Sidney, Canada

[73] Assignee: Newco Fireplace Equipment Limited, Inc., Portland, Oreg.

[21] Appl. No.: 630,611

[22] Filed: Nov. 10, 1975

[51] Int. Cl.$^2$ .................. F24C 1/16; A47J 37/00; F24B 3/00
[52] U.S. Cl. ............................. 126/9 R; 126/2; 126/25 A; 126/25 B; 126/25 C
[58] Field of Search .................. 126/9 R, 25 R, 25 A, 126/25 B, 25 C, 9 B, 2, 3; 99/339, 340, 372; D7/107, 108, 109, 110

[56] References Cited

U.S. PATENT DOCUMENTS

| | | | |
|---|---|---|---|
| 2,552,861 | 5/1951 | Overman | 126/9 R X |
| 2,893,373 | 7/1959 | Rundle | 126/9 |
| 2,923,229 | 2/1960 | Halford | 126/25 C |
| 3,040,730 | 6/1962 | Hurko et al. | 126/25 A |
| 3,182,585 | 5/1965 | Renscil et al. | 126/25 A |
| 3,717,137 | 2/1973 | Moline et al. | 126/25 B |
| 3,911,892 | 10/1975 | Harris | 126/9 R |

FOREIGN PATENT DOCUMENTS

| | | | |
|---|---|---|---|
| 1,414,620 | 11/1964 | France | 126/25 R |
| 2,120,440 | 11/1972 | Germany | |

Primary Examiner—William F. O'Dea
Assistant Examiner—Harold Joyce
Attorney, Agent, or Firm—Harness, Dickey & Pierce

[57] ABSTRACT

A portable cooking unit for use with charcoal or similar fuel comprises dished fuel trays open at both ends and joined pivotally to a frame for movement between a raised substantially vertical portion, in which they are adjacent one another, and a lowered substantially horizontal cooking position. Perforate grills are positionable in grill support means located in the fuel trays to retain fuel in the fuel trays for lighting when the fuel trays are in their raised position, and to cook on when the fuel trays are in their lowered position. A top damper is positionable over the upper open end of the fuel trays when they are in their raised position to smother the fuel when cooking is finished.

22 Claims, 3 Drawing Figures

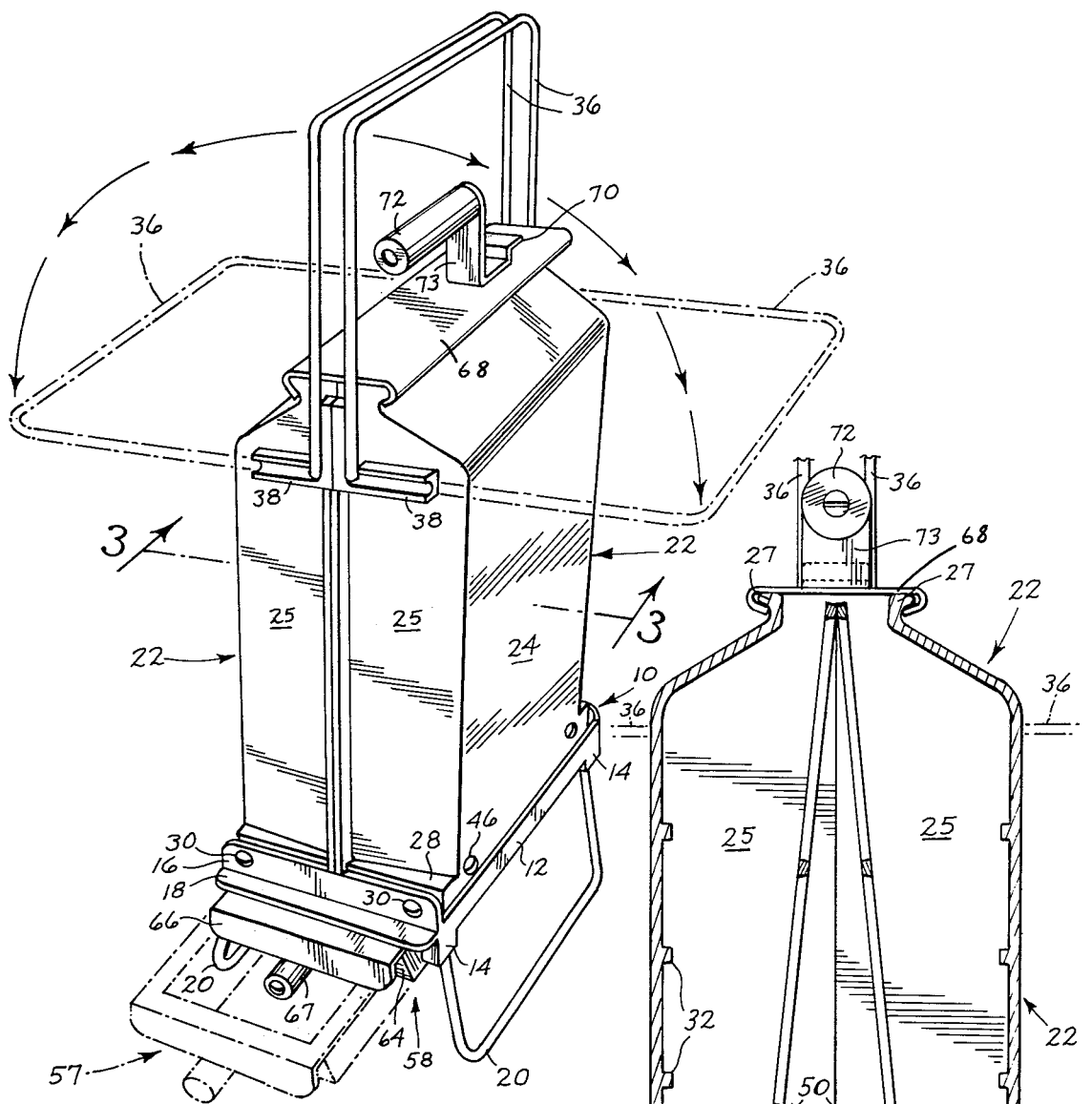
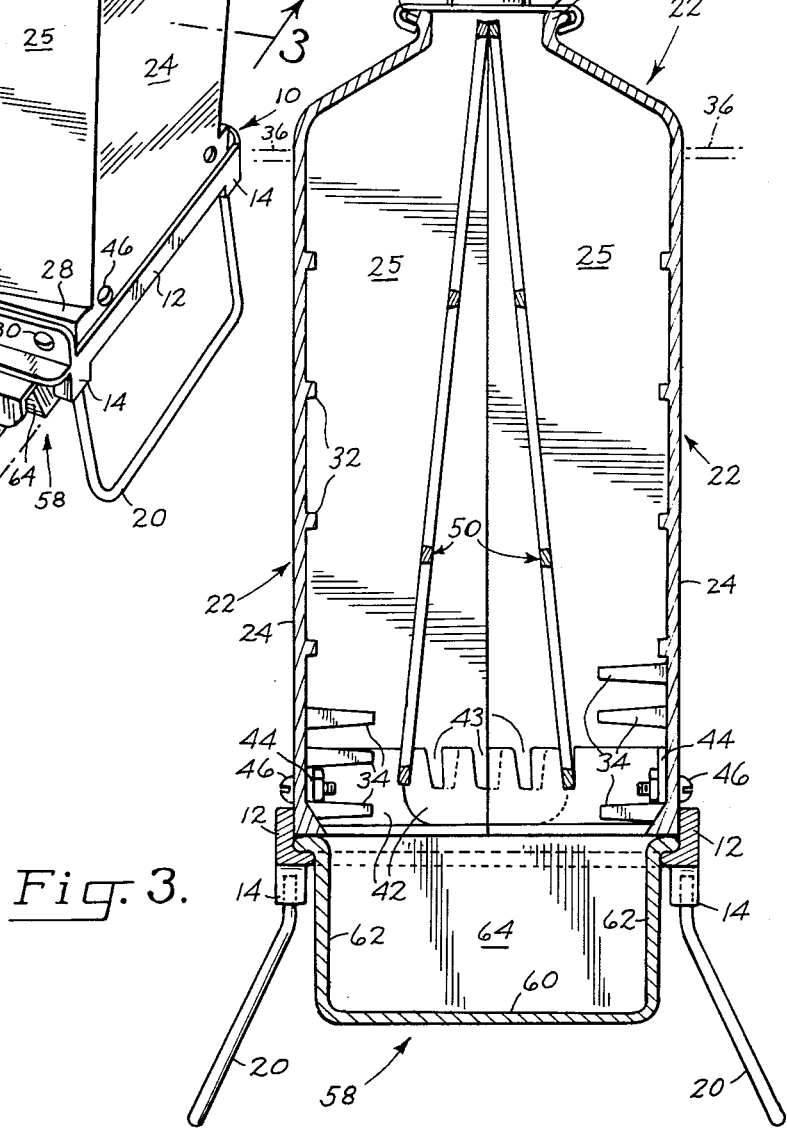
Fig. 2.
Fig. 3.

SELF EXTINGUISHING, PORTABLE COOKING UNIT HAVING FOLDING FUEL TRAYS

BACKGROUND OF THE INVENTION

This invention relates to a portable cooking unit and in particular to a cooking unit which is foldable to aid in the ignition and smothering of the fuel.

Prior art portable cooking units generally have a fixed bed into which the fuel is placed for lighting and cooking. A grill is positioned in an adjustable manner over this bed to provide a cooking surface.

Since a fixed bed cooking unit has no draft means to aid in the ignition and burning of the fuel, the lighting and warm up of the cooking unit is slow. In a fixed bed cooking unit up to 45 minutes may be required for the fuel to attain cooking temperature. In addition, when the cooking is finished the remaining fuel must either be removed from the cooking unit for smothering or allowed to burn to ash. The former is dirty and dangerous and the latter is costly.

Accordingly, it is the general purpose of the present invention to provide a portable cooking unit having folding fuel trays to aid in rapid ignition and smothering of the fuel.

It is a further object of the present invention to provide such a cooking unit which has a lighter drawer in which to place a lighter source for igniting the fuel and to collect the ashes from the fuel trays when the cooking is completed.

It is a further object of the present invention to provide such a cooking unit having grill support means to position the grill in the fuel trays in such a manner as to distribute the charcoal for quick lighting by the lighter source.

It is a further object of the present invention to provide such a cooking unit which incinerates residual grease and sterilizes the grill while the fuel is being smothered.

It is a further object of the present invention to provide such a cooking unit which when folded is compact to take up less storage space than fixed bed cooking units of the same capacity.

THE DRAWINGS

The manner in which the foregoing and other objects of the invention are accomplished will be apparent from the accompanying specification and claims considered together with the drawings wherein:

FIG. 2 is a side perspective view of the cooking unit in its closed position; and FIG. 3 is a cross sectional view taken on the line 3—3 of FIG. 2.

GENERAL STATEMENT OF THE INVENTION

Figure 1:
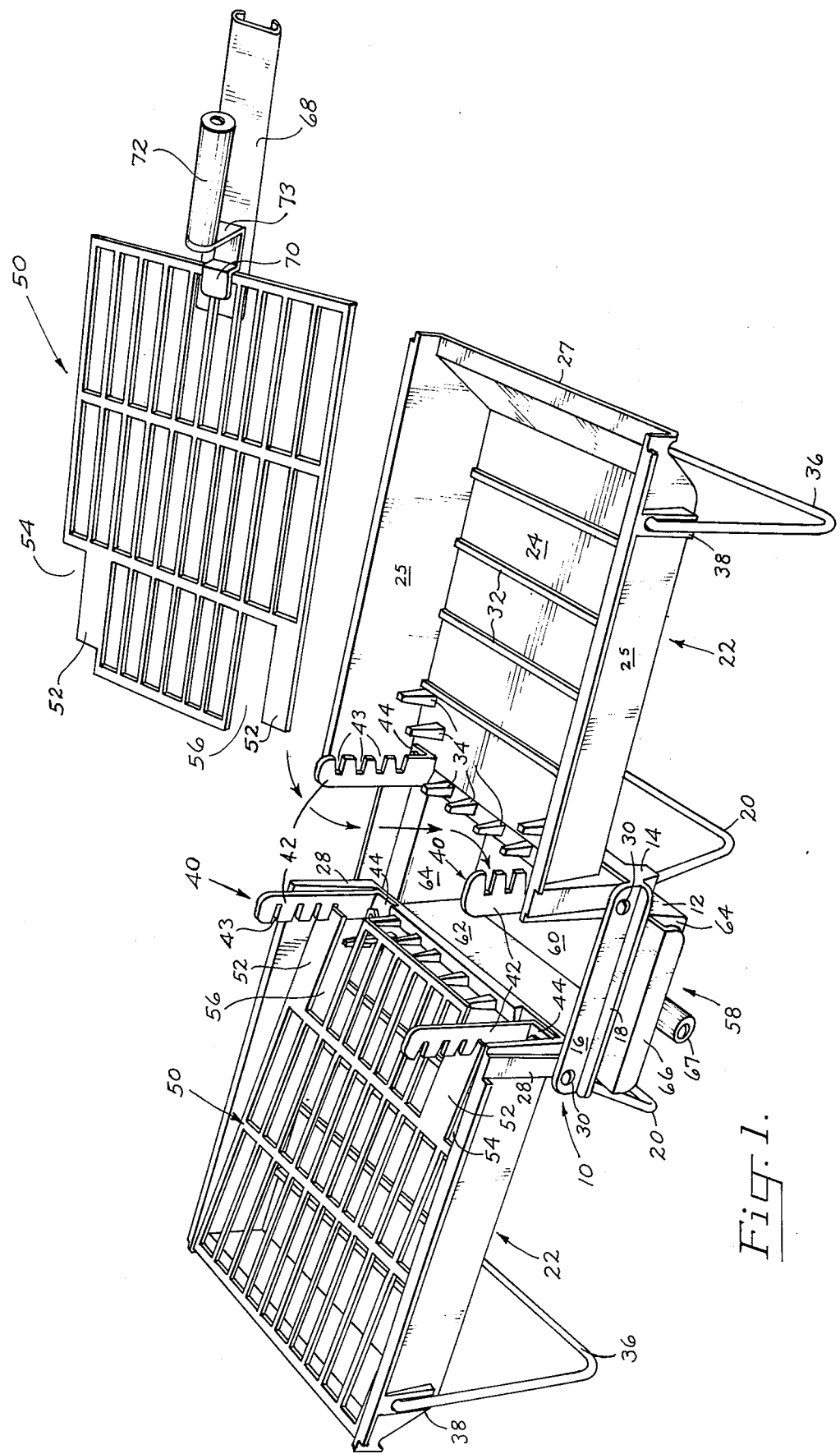
FIG. 1 is a top perspective view of the herein described cooking unit in its open position with one of the perforate grills removed better to show concealed construction.

The cooking unit of the present invention generally comprises a frame defining a central opening with dished fuel trays pivotally joined to opposed ends of the frame for movement between a raised lighting position and a lowered cooking position. When in their raised position, the fuel trays substantially are vertical and are located adjacent one another. When in their lowered position, the fuel trays substantially are horizontal.

The fuel trays are open at each end to form a flue when they are in their raised position. Thus air can pass from the central opening of the frame through the fuel trays and out their open upper ends.

Grill supports are located within the dished fuel trays to receive perforate grills. The perforate grills are positioned in the grill support in a manner to provide a narrow fuel retention space between the perforate grills and the fuel trays.

DETAILS OF A PREFERRED EMBODIMENT

Referring to FIG. 1 of the drawings, the cooking unit of the present invention includes frame 10. The frame defines a rectangular central open area and comprises L-shaped side portions 12 having tabs 14 depending from each corner. End portions 16 are planar and extend above the upper edge of the side portions. Outward facing flanges 18 may be located on the end portions to aid in handling the cooking unit. U-shaped legs 20 are located below each of the side portions depending from joinder to tabs 14.

Dished fuel trays 22, to hold the fuel (not shown), are joined pivotally to the frame above its side portions. The fuel trays comprise rectangular bottoms 24 and peripendicular sides 25. Both ends of the fuel trays are open. However at the upper ends of the bottoms are tapered inwardly to form restricted openings. Outward facing lips 27 are located on the upper ends of the fuel trays adjacent the upper openings.

Locating mounts 28 are located adjacent the lower ends of the side portions of the fuel trays. These serve the function of sealing the lower end of the fuel trays against the frame, thereby assisting in smothering the fire at the conclusion of the cooking operation.

Bolts 30 pass through aligned holes in both the end portions 16 of the frame and the locating mounts for joinder of the fuel trays pivotally to the frame. Thus the fuel trays are movable between a raised, substantially vertical position in which the sides 25 are adjacent each other, FIG. 2, and a lowered substantially horizontal cooking position, FIG. 1.

To support the fuel in the fuel trays when the fuel trays are placed in their raised position, teeth 34 are located on the bottoms of the fuel trays at their lower open ends. The teeth preferably extend inwardly a distance equal to approximately one-half the depth of the fuel trays. The spacing of the teeth is not critical, but they should be close enough together to prevent passage of partially burned fuel until the fuel substantially is consumed. The teeth positioned at each side may be staggered inwardly on the bottom of the fuel trays to prevent partially burned fuel from lodging in the corners.

To maintain even distribution of the fuel longitudinally in the fuel trays when they are placed in their raised position, rails 32 are located transversely on the inside bottom surfaces of the fuel trays. The rails are shallow, preferably extending inwardly a distance equal to approximately 10–20% of the depth of the fuel trays.

C-shaped bails 36 are joined pivotally to the upper ends of the fuel trays to allow the user to carry the cooking unit when the fuel trays are in their raised position. Detents 38 are located in the sides of the fuel trays adjacent the bails to retain the bails releasably in a position normal to the fuel trays. Thus the bails serve as supports when the fuel trays are in their lowered position.

Grill support means 40 are located within the fuel trays inwardly adjacent locating mounts 28. The grill support means comprise multi-slotted brackets 42. Preferably, two such brackets are located at the lower end of each fuel tray with opposed brackets offset from one another to allow moving the trays to their raised position. The inward staggering of teeth 34 at the sides of the trays prevents partially burned fuel from interfering with the brackets when folding the unit.

Slots 43 are positioned in the brackets so that they angle slightly upwardly when the fuel trays are in their lowered position, as shown in particular in FIG. 1. Thus when the fuel trays are in their raised position, FIG. 3, for lighting of the fuel, the perforate grills 50 are positioned to slope inwardly to touch or almost touch at their top to give a triangular configuration. Due to this angle the fuel retention spaces are larger at the top of the fuel trays than at the bottom of the fuel trays. This allows the vertically rising flames to lick all of the fuel pieces resting against the upwardly converging grills 50, thereby insuring rapid ignition of all of the fuel. The lower portions of the brackets comprise tabs 44 which allow mounting the grill support means to the bottoms of the fuel trays by means of bolts 46. Preferably the brackets are of a length equal to approximately 1½ times the depth of the fuel trays.

Perforate grills 50 fit into the grill support means to supply the cooking surface in the cooking unit. The perforate grills preferably comprise planar rectangular members having a plurality of rectangular openings. Mounting tabs 52 are located at one end of the perforate grills.

One of the mounting tabs is located at one of the edges of the perforate grills and the opposed tab is offset inwardly from the other edge to align with the offset brackets of the grill support means. Openings 54 are located outwardly adjacent the offset tabs and slots 56 are located inwardly adjacent the edge located tabs to provide clearance for the opposed brackets when the fuel trays are placed in their raised position.

Lighter drawer 58 is mounted slideably below frame 10 to hold a lighting charge (not shown) such as kindling or crumpled paper used to ignite the fuel. The lighter drawer comprises bottom 60, sides 62, and ends 64. The top portions of the sides are flared outwardly to engage the side portions 12 of the frame in a sliding relationship. Lip 66 is located on the front end of the lighter drawer to allow opening it. Pull 67, fabricated from a thermally non-conductive material, is positioned on the front end of the lighter drawer to aid in opening it when hot. The lighter drawer fits into the frame in such a manner that when it is closed, the lower open ends of the fuel trays are sealed. The lighter drawer is configured in a manner to allow the flared top portions of the sides to freely slide on the frame. Thus the drawer may be moved to a position opening its front portion or removed entirely from the frame.

The central elements of teeth 34 are offset inwardly on the bottom of the fuel trays a distance sufficient to provide clearance for the drawer, so that when it is opened and closed it will not jam because of partially burned fuel wedged between and projecting below the teeth.

Top damper 68 is configured to fit over lips 27 at the upper end of the fuel trays as shown in FIG. 3, thus closing the top opening. The top damper is configured to engage the lips tightly to squeeze the opposed sides 25 of the fuel tray into contact with one another.

Grill engagement means, such as clip 70, is located on the top surface of the top damper to engage the perforate grill and to allow use of the top damper as a handle for the perforate grill when hot. The clip preferably is joined to the top damper by welding. Handle 72 extends from a raised tab 73 on the engagement means to allow manipulation when the top damper is hot. In addition the handle may be used for carrying the unit in the event that bails 36 should be misplaced. The handle is fabricated from a thermally non-conductive material such as wood or plastic.

The cooking units of the present invention can be made of any suitable heat resistant material, such as cast iron, steel or aluminum. However, cast iron will better withstand severe use and provide more overall durability and longer life.

It will be noted that while the preferred embodiment shows a small portable unit, different size units also may be made. If desired a large unit for patio or backyard use could include wheels to allow movement.

OPERATION

The manner of use of the herein described cooking unit is as follows:

To fill the cooking unit with fuel the top damper 68 is removed from the fuel trays. The bails 36 are placed in their lowered position in detents 38. The fuel trays then are placed in their lowered position as shown in FIG. 1, and both perforate grills 50 are removed from the grill support means 40.

Fuel is distributed evenly over the bottom of the fuel trays in a manner to fill the fuel trays to the desired extent. If charcoal briquettes are used, one layer of charcoal will serve this purpose. This layer may cover all or part of the tray area to provide the needed amount of cooking surface.

The perforate grills are repositioned in the fuel support means in the lowermost slots of the brackets and the fuel trays are placed in their raised position. It will be noted that rails 32 in conjunction with the perforate grills maintain most of the fuel in its evenly distributed position when the fuel trays are raised. Teeth 34 prevent fuel which is not maintained in its original position from dropping out of the fuel trays. The top damper is not replaced leaving the upper ends of the fuel trays open.

To light the fuel, lighter drawer 58 is pulled open to allow insertion of a lighting charge. The lighting charge may comprise one of the commercially available lighter materials. Alternatively, kindling or crumpled paper soaked with lighter fluid may be used. It is important that the lighter charge provide long lasting hot flames to insure thorough lighting of the fuel. If the fuel is charcoal it also may be soaked with ligher fluid to insure good ignition.

The lighter drawer is placed in a partially open position, as shown by the phantom lines of FIG. 2, as required to provide the necessary draft. In the normal operation of the unit the drawer is opened a distance equal to about one tenth its length in order to achieve this purpose.

The lighter source then is ignited. With the lighter drawer in a partially open position air may enter the fuel trays through openings behind and in front of the lighter drawer. Thus a flue is formed through the fuel trays and out their opened top ends and a draft is created when the lighter charge is ignited. The flames of the lighter charge are drawn into direct contact with the fuel located in the fuel trays to light it quickly and uniformly. The inwardly angled grill giving larger spaces at the top of the fuel trays insures ignition of all of the fuel.

The unit then is ready for cooking by repositioning the fuel trays in their lowered position. Bails 36 convert from handles to serve as legs and support the fuel trays during the cooking. The perforate grills may be repositioned in the grill support means as desired to provide the proper cooking position relative the fuel. As shown in FIG. 1, top damper 68 may be used as a handle for the perforate grills by placing clip 70 on the perforate grills thus allowing handling them when hot.

When the cooking is completed the perforate grills are placed again in the lowermost slots of brackets 42. Lighter drawer 58 is placed in its closed position. The fuel trays are placed again in their raised position. It will be noted that when the fuel trays are raised the ashes from the fuel will drop substantially unrestricted past the teeth 34 into the lighter drawer. The partially burned fuel, however, will be maintained in the fuel trays by teeth 34.

Top damper 68 is positioned on the fuel trays, squeezing them together and closing the openings at the upper end. The fuel trays essentially are sealed and the remaining fuel is smothered. Thus the remaining fuel can be reused for a subsequent cooking rather than completely burned to ash as is the case in previous cooking units. One charge of fuel may last for up to 4 or 5 cookings on thawed meats and the like, and up to 3 cookings on frozen meats and the like.

When the fuel trays are closed and the top damper is installed the heat generated by the fuel, until it is smothered, is trapped in the cooking unit. The resulting high temperature incinerates any grease on the perforate grills which are located adjacent the fuel. The cooking unit therefore is self cleaning, eliminating the grill cleaning associated with prior cooking units.

When the fuel has been completely smothered, the lighter drawer can be removed from the frame and the ash emptied from it. This eliminates the dirty removal of ash from a grill base as is necessary in the prior cooking units.

It will be noted that when a smaller cooking area is required fuel may be placed in only one of the fuel trays. When cooking is performed on only one of the fuel trays the unused fuel tray may be placed in its raised position to serve as a windbreak. In addition when there is fuel in one of the fuel trays, baked potatoes, corn on the cob or the like may be placed behind the perforate grill of the other fuel tray and rapidly cooked by moving both of the fuel trays to their raised positions.

Also it will be noted that due to the high draft created in the unit when in the closed position, it may serve as a small blacksmith forge. Furthermore, by partially closing the damper the unit will burn the fuel slowly and may be used as a portable heater when in the closed position.

It will be noted also that the lighter drawer may be used as an oven or it may be filled with water for use as a cooking pan.

Having thus described my invention in a preferred embodiment, I claim:

1. A portable cooking unit for use with charcoal or similar fuel comprising
   a. a frame,
   b. dished fuel trays pivotally joined to the frame and positionable between a raised substantially vertical lighting position in which the fuel trays are located adjacent one another and a lowered substantially horizontal cooking position,
   c. the fuel trays having open upper ends and open lower ends to form a flue allowing air passage therethrough when the fuel trays are in their raised position,
   d. grill support means located within and movable with the dished fuel trays, and
   e. perforate grills removably positionable in the grill support means in a manner to provide a fuel retention space between each tray and grill for receiving the fuel.

2. The cooking unit of claim 1 wherein the grill support means comprises multi-slotted brackets configured to receive the grills and locate them at spaced intervals above the bottoms of the fuel trays.

3. The cooking unit of claim 2, said brackets being secured to portions of said fuel trays adjacent their pivotal connections with said frame, the brackets and said fuel trays being laterally offset from each other as to be in non-interfering relation when the trays are raised.

4. The cooking unit of claim 1 wherein the perforate grills may be positioned in the grill support means in a manner to separate the perforate grills from the fuel for cooking.

5. The cooking unit of claim 1 wherein the perforate grills are positioned in the fuel trays at inwardly facing angles, when the fuel trays are in their raised position.

6. The cooking unit of claim 1 including bails pivotally joined to the fuel trays and positionable between a raised carrying position to carry the cooking unit when the fuel trays are in their raised position, and a lowered supporting position to support the fuel trays in their lowered position.

7. The cooking unit of claim 1 including raised rails located transversely in the fuel trays to prevent the fuel from moving downward when the fuel trays are placed in their raised position.

8. The cooking unit of claim 1 including protruding teeth located at the open lower ends of the fuel trays to prevent the fuel from passing therethrough.

9. The cooking unit of claim 1 including a lighter drawer mounted in the frame below the fuel trays and slideable between an open position to allow air into the flue and a closed position to prevent air from entering the flue.

10. The cooking unit of claim 9, further provided with damper means mounted across the open upper ends of the fuel trays in their raised position and movable between open and closed positions, the damper and drawer co-operating when in their closed positions to exclude air from the fuel trays and thereby extinguish the fuel.

11. The cooking unit of claim 10, said lighter drawer fitting into said frame in such a manner that when in its closed position the lower open ends of the raised fuel trays are sealed.

12. The cooking unit of claim 1 including a top damper which fits over the open upper ends of the fuel trays when in raised position to close the flue.

13. The cooking unit of claim 1 wherein the perforate grills are positioned in the fuel trays in laterally spaced relation, when the fuel trays are in their raised position, to provide an air space between the grills.

14. The cooking unit of claim 1 including a top damper releasably closing the open upper ends of the fuel trays, when in raised position, and releasably securing the trays together, in said raised position, substantially closing the abutting side edges of the trays.

15. The cooking unit of claim 1, said fuel trays being pivotally joined to said frame at their inner ends and adjacent their bottoms.

16. A portable cooking unit for use with charcoal or similar fuel comprising:
   a. a frame,
   b. dished fuel trays pivotally joined to the frame and positionable between a raised substantially vertical lighting position, in which the fuel trays are located adjacent one another, and a lowered substantially horizontal cooking position,
   c. the fuel trays having open upper ends and open lower ends to form a flue allowing air passage therethrough when the fuel trays are in their raised position,
   d. grill support means located within and movable with the dished fuel trays comprising multi-slotted brackets configured to receive the grills and locate them at spaced intervals above the fuel trays.
   e. perforate grills removably positionable in the grill support means between a position to provide a fuel retention space therebetween for receiving the fuel, and a position to separate the perforate grills from the fuel for cooking,
   f. bails pivotally joined to the fuel trays and positionable between a raised carrying position to carry the cooking unit when the fuel trays are in their raised position, and a lowered supporting position to support the fuel trays in their lowered position,
   g. raised rails located transversely in the fuel trays to prevent the fuel from moving downward when the fuel trays are placed in their raised position,
   protruding teeth located at the open lower ends of the fuel trays to prevent the fuel from passing therethrough,
   i. a lighter drawer mounted in the frame below the fuel trays slideable between an open position to allow air into the flue and a closed position to prevent air from entering the flue, and
   j. a top damper which fits over the open upper ends of the fuel trays to close the flue.

17. A solid fuel stove comprising in combination a base, a pair of fire pan means pivotally supported on the base and swingable between an open-face-to-open-face fuel-ignition-chamber-forming-relation and an end-to-end aligned open-face-up burning fuel holding relation, upper portions of the fire pan means in fuel-ignition-chamber-forming-relation forming an upright hollow enclosure having an upper open-mouth, there being air inlet means provided in the lower portions of each of fire pan means in fuel-ignition-chamber-forming-relation to permit entry of air into the enclosure.

18. A portable cooking unit for use with charcoal or similar fuel, comprising:
   a. a frame,
   b. dished fuel trays pivotally joined to the frame and positionable between a raised, substantially vertical fuel-igniting position in which the fuel trays are located adjacent one anoter and a lowered, substantially horizontal cooking position,
   c. the fuel trays having open upper ends and open lower ends to form a flue allowing air passage therethrough when the fuel trays are in their raised position,
   d. perforate grills removably positionable in the trays in a manner to provide a fuel retention space between each tray and grill, and
   e. grill mounting means positioned for maintaining the grills in upwardly converging relation to each other when the trays are in their raised position, thereby exposing to flame rising vertically from below pieces of fuel retained against the upwardly converging grills along substantially the length of the grills for promoting uniform ignition of the fuel.

19. A portable cooking unit for use with charcoal or similar fuel, comprising:
   a. a frame,
   b. dished trays pivotally joined to the frame and positionable between a raised, substantially vertical fuel-igniting position in which the fuel trays are located adjacent one another and a lowered, substantially horizontal cooking position,
   c. the fuel trays having open upper ends and open lower ends to form a flue allowing air passage therethrough when the fuel trays are in their raised position,
   d. perforate grills removably positionable in the trays in a manner to provide a fuel retention space between each tray and grill, and
   e. a plurality of teeth on the open lower ends of the trays projecting inwardly therefrom when the trays are in their raised position and spaced apart to retain pieces of fuel within the fuel retention space but to allow fuel ash to gravitate downwardly between them.

20. The cooking unit of claim 19 including a drawer mounted removably on the frame below the fuel trays for receiving fuel ash therein and movable between open and closed positions.

21. The cooking unit of claim 20 including damper means mounted across the open upper ends of the fuel trays in their raised position and movable between open and closed positions, the damper and drawer cooperating when in their closed positions to exclude air from the fuel trays and thereby extinguish the fuel.

22. A portable cooking unit for use with charcoal or similar fuel, comprising:
   a. a frame,
   b. dished fuel trays pivotally joined to the frame and positionable between a raised, substantially vertical fuel-igniting position in which the fuel trays are located adjacent one another and a lowered, substantially horizontal cooking position,
   c. the fuel trays having open upper ends and open lower ends to form a flue allowing air passage therethrough when the fuel trays are in their raised position,
   d. perforate grills removably positionable in the trays in a manner to provide a fuel retention space between each tray and grill,
   e. fuel retention means on the trays for retaining pieces of fuel within the fuel retention space while allowing fuel ash to graviate downwardly between them when the trays are in their raised position,
   f. a drawer mounted on the frame below the fuel trays for receiving fuel ash therein, and movable between open and closed positions, and
   g. damper mounted across the open upper ends of the fuel trays in their raised position and movable between open and closed positions, the damper and drawer cooperating when in their closed positions to exclude air from the fuel trays and thereby extinguish burning fuel contained in the trays.

* * * * *

UNITED STATES PATENT AND TRADEMARK OFFICE
CERTIFICATE OF CORRECTION

PATENT NO. : 4,046,132
DATED : September 6, 1977
INVENTOR(S) : Charles R. White

It is certified that error appears in the above-identified patent and that said Letters Patent are hereby corrected as shown below:

| | |
|---|---|
| Abstract, Line 4: | "portion" should be --position--. |
| Column 6, Line 19: | "and" should be --of--. |
| Column 7, Line 63: | "anoter" should be --another--. |

Signed and Sealed this

Twenty-first Day of February 1978

[SEAL]

Attest:

RUTH C. MASON
*Attesting Officer*

LUTRELLE F. PARKER
*Acting Commissioner of Patents and Trademarks*